United States Patent [19]

Isaac

[11] Patent Number: 5,181,462

[45] Date of Patent: Jan. 26, 1993

[54] DISPOSAL COMPACTOR FOR AEROSOL CANS

[75] Inventor: J. Wayne Isaac, Sheridan, Ark.

[73] Assignee: Aerosol Disposal Systems, Inc., Sheriden, Ark.

[21] Appl. No.: 696,008

[22] Filed: May 6, 1991

[51] Int. Cl.⁵ ............................ B30B 9/04; B30B 9/32
[52] U.S. Cl. .................................. 100/98 R; 100/108; 100/902; 222/83.5; 141/65; 141/330
[58] Field of Search ............. 222/83.5; 100/902, 98 R, 100/266, 268, 111, 108, 104, 125; 141/65, 330

[56] References Cited

U.S. PATENT DOCUMENTS

| | | | |
|---|---|---|---|
| 1,998,263 | 4/1935 | Townsend | 100/902 |
| 2,717,720 | 9/1955 | Nissen | 222/83.5 |
| 3,044,503 | 7/1962 | Iketani | 141/330 |
| 3,788,519 | 1/1974 | Mengel | 222/83.5 |
| 3,835,768 | 9/1974 | Kidson | 100/902 |
| 4,081,006 | 3/1978 | Crowell | 222/83.5 |
| 4,231,361 | 11/1980 | Wise | 222/83.5 |
| 4,927,085 | 5/1990 | Oberg | 100/902 |
| 5,067,529 | 11/1991 | Gonzalez-Miller | 100/902 |

FOREIGN PATENT DOCUMENTS 953337  3/1964  United Kingdom ................ 141/329

Primary Examiner—Philip R. Coe
Assistant Examiner—Randall Edward Chin
Attorney, Agent, or Firm—Stephen D. Carver

[57] ABSTRACT

An automatic compactor-crusher for processing spent aerosol spray cans safely depressurizes, evacuates, and crushes cans for subsequent environmentally sound disposal and/or recycling. Fluid residue is safely captured within a reservoir. A vertically upright, supporting frame secured to a floor in the work area supports a telescoping can receiver assembly. The receiver assembly matingly receives cans for processing. A hydraulic crusher assembly located on top of the frame compresses cans against the receiver assembly with an extensible ram. The receiver assembly comprises a tubular sleeve which coaxially receives a displaceable cylinder. A rigid union at the bottom of the sleeve limits travel of the cylinder, and establishes a fluid flow path into a holding tank. A rigid valve guide projecting from the union mounts a fluid control valve for selectively blocking fluid escape from the receiver, and a rigid, canpiercing lance which punctures cans after sufficient ram displacement. The valve stem mounts a tubular receptacle which coaxially mates with the spray can actuator nozzle. After sufficient ram movement the can will be forcibly punctured by the lance. Downward movement of the sleeve is limited, and further ram movement will forcibly compress the can when sleeve travel stops and ram movement continues.

1 Claim, 6 Drawing Sheets

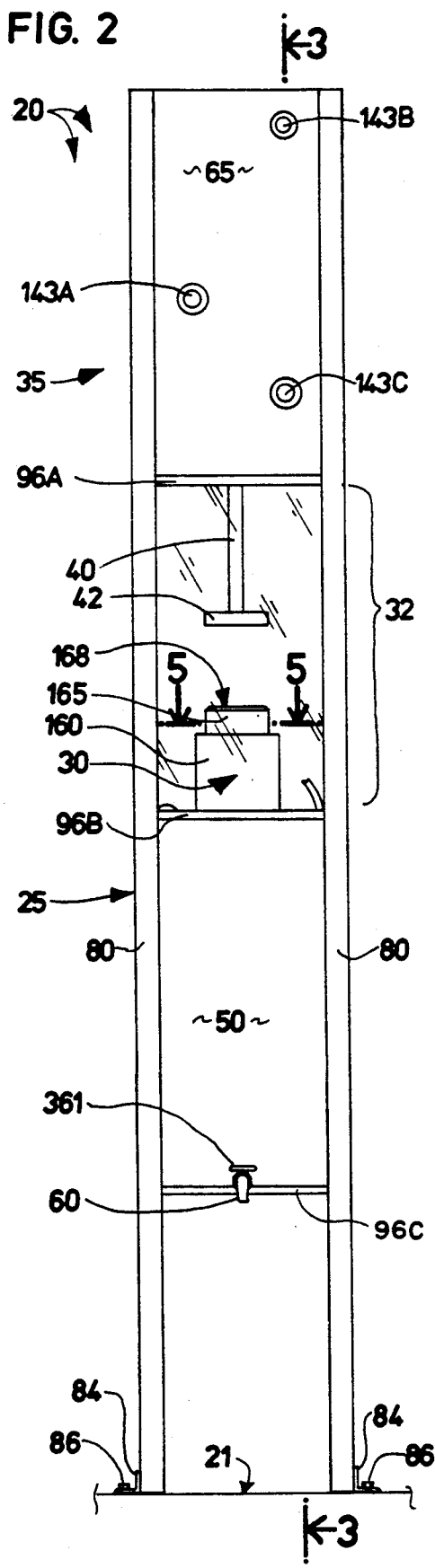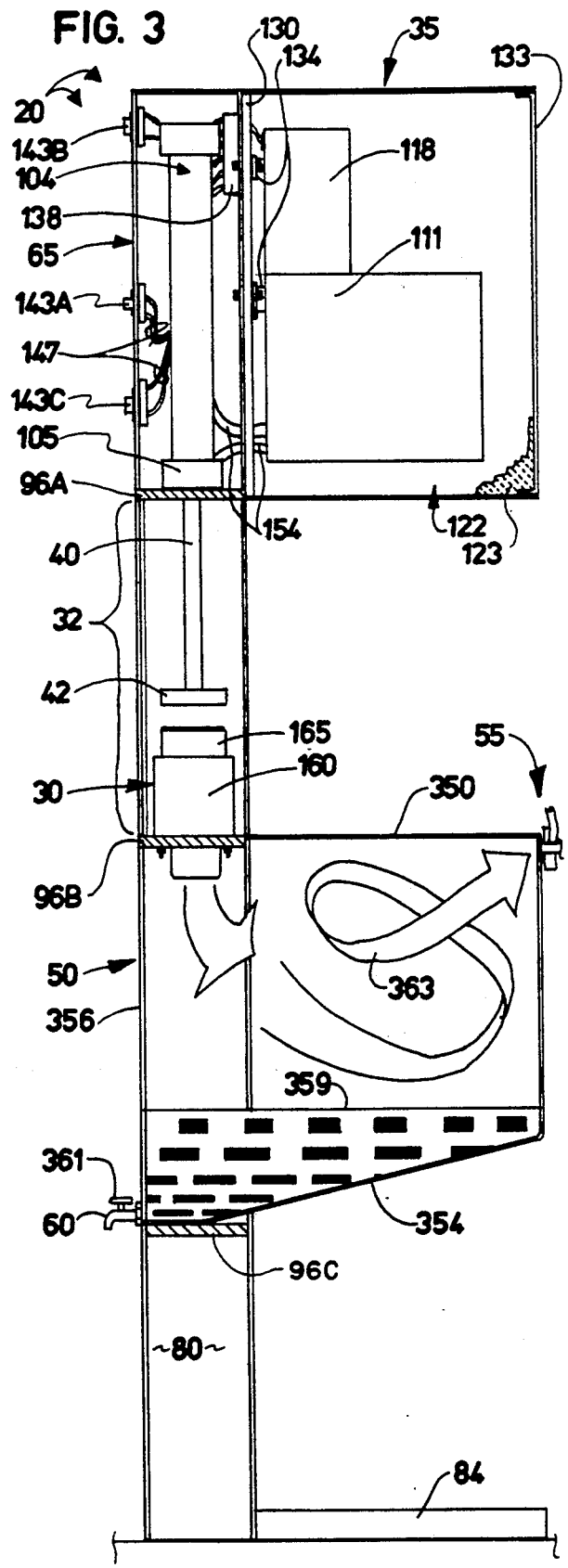

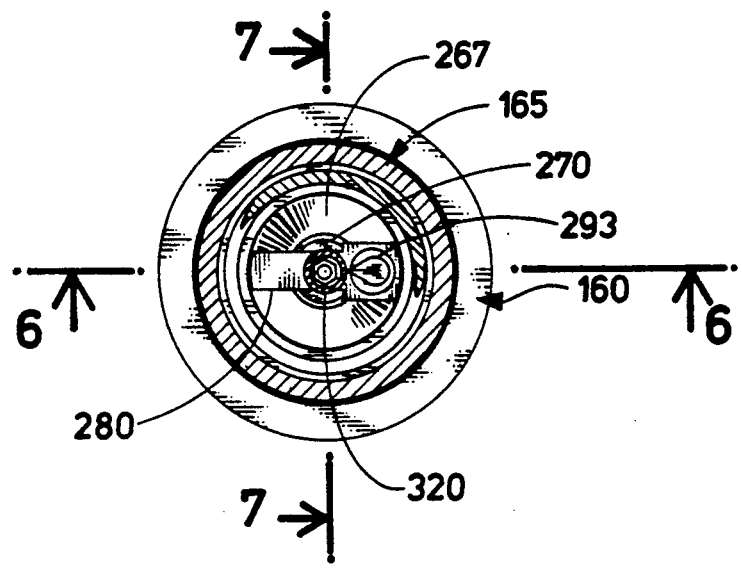
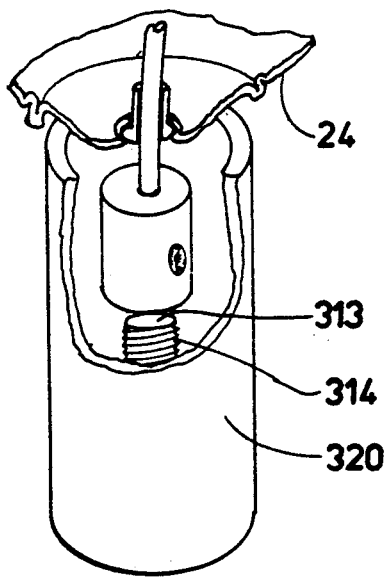
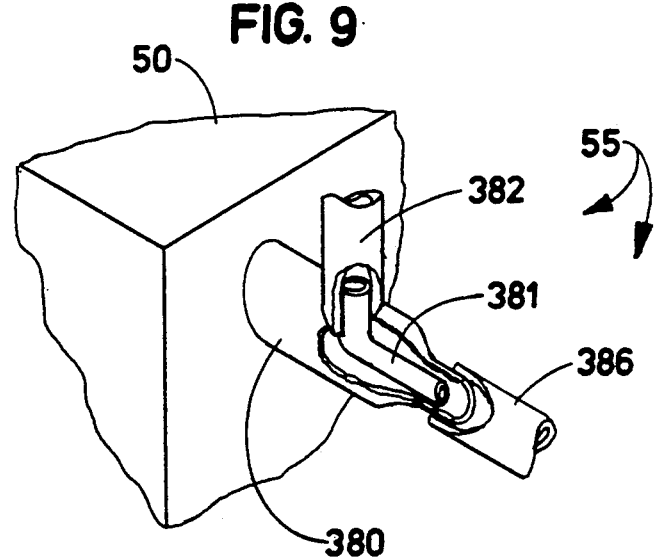

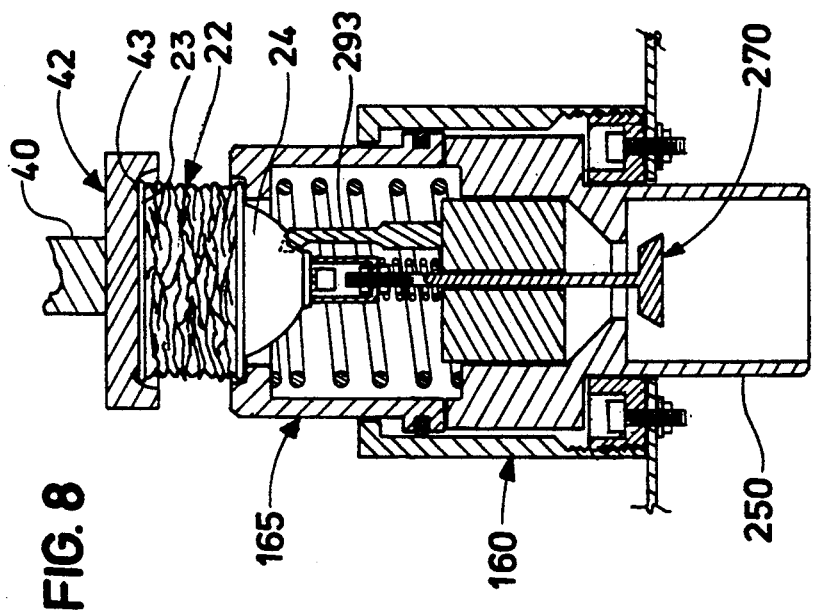

DISPOSAL COMPACTOR FOR AEROSOL CANS

BACKGROUND OF THE INVENTION

The present invention relates broadly to apparatus for disposing of waste aerosol cans. More specifically, the present invention relates to a system for safely evacuating and crushing spent aerosol cans, and disposing of their unwanted waste contents in an environmentally sound manner.

Aerosol cans typically comprise an interior, pressurized chamber protected by a rigid exterior sleeve. The pressurized chamber is normally filled with a liquid product such as hair lacquer and subsequently sealed by a spray valve. A gaseous propellant such as chlorinated hydrocarbons, butane, vinyl chloride, or nitrogen gas is forced into the pressurized chamber which is thereafter sealed. Such cans often contain dangerous or toxic substances. Because they are packaged under such high pressure, disposal by incineration is unsafe because of the danger of explosion.

In recent years, public awareness as to the environmental and human health risks of uncontrolled waste disposal has greatly increased. In response, various organizations including the Environmental Protection Agency (EPA) have undertaken to study the toxic effects of various compounds, and set forth guidelines for controlling disposal of such compounds. Certain materials have been classified as hazardous and may not be applied to the land in any form, whether diluted or treated. In the past, partially empty aerosol cans were disposed of in conventional 55-gallon drums. As of May, 1990 aerosol cans known to contain EPA-listed chemicals may no longer be disposed of in landfills. Aerosol cans may not be landfilled unless proven empty, and delivered in suitable storage containers.

Moreover, disposal of whole aerosol cans is impractical from an economic standpoint. Roughly 200 unevacuated cans could be fitted into a typical drum. Routinely, the cost of disposing of a 55-gallon drum of aerosol cans as solid waste runs roughly $1000.00. Hence, disposal of the cans involved is too expensive to serve the economic interests of industry.

Thus, landfill disposal of aerosol cans as solid waste is not only environmentally unsound, but also economically questionable.

On the other hand, a 55-gallon barrel of toxic liquid waste can be incinerated at a price roughly $150.00. Based on my experimentation, a 55-gallon barrel will contain the fluid contents of roughly 5000 aerosol cans. Once the cans are emptied, they can be crushed or comminuted for recycling. Thus it is desirable to provide apparatus for evacuating aerosol cans and crushing them to ensure environmentally sound disposal.

In the prior art known to me, various methods have been proposed for evacuating aerosol cans. For example, Cound, in U.S. Pat. No. 4,459,906, issued Jul. 17, 1984 describes a hydraulic can crusher that mechanically feeds a can into a crushing compartment, punctures the can with a rigid lance associated with an air chamber, and collects the released products into a processing tank. The system employs hydraulics for powering the aerosol can crusher.

Various prior art patents specifically directed to the safe evacuation and disposal of aerosol products include U.S. Pat. Nos. 3,935,973 and 3,935,974, issued Feb. 3, 1976 to Weyn; and Feldt Pat. No. 4,407,341, issued Oct. 4, 1983. The latter device employs a discharge ram, a suction chamber for receiving gaseous products, and a liquid container for receiving the liquid component for processing prior to disposal. Large-scale can compressors are illustrated in U.S. Pat. No. 4,474,108 issued to Lonze on Oct. 2, 1984 and Heiser, U.S. Pat. No. 3,916,780, issued Nov. 4, 1975.

Additionally, Chipman Pat. No. 4,349,054 issued Sept. 14, 1982 mechanically engages an aerosol can within a chamber. The can is punctured with a rigid, vented ram associated with an isolation chamber. Flammable propellant products are captured in the container for processing. The chamber feeds escaping gases and liquid product into a filtering device prior to venting.

One very relevant prior art system is taught by Meadows, U.S. Pat. No. 4,356,981, issued Nov. 2, 1982. This system mechanically punctures the can, separates the gaseous from the liquid component, heat-processes the liquid component below atmospheric pressure, and vents gasses resulting from processing into the atmosphere via a venturi.

However, the aforedescribed systems are generally too complex and expensive for use by individuals such as in a typical waste recycling center. As public awareness of the environmental and health hazards increases, the demand grows for safe, practical means of managing such solid waste disposal. Unfortunately, none of the prior art can crusher systems known to me is capable of conveniently and safely containing, evacuating, and crushing an aerosol can in a single cycle.

Summary of the Invention

I have developed a new Disposal Compactor for Aerosol Cans that safely depressurizes, evacuate, and crushes spent aerosol cans for subsequent environmentally sound disposal or recycling. The unused fluid residue is safely captured within my system for subsequent safe disposal. My compactor can be safely operated by an individual of ordinary skill. It is particularly well-suited for use in local recycling centers or waste processing stations.

In the best mode an upright, supporting frame is secured to a concrete floor in the work area. A telescoping can receiver assembly centrally secured to the frame receives cans for processing. A hydraulic crusher assembly located on top of the frame compresses cans to be processed against the receiver assembly. During compression cans will be punctured, crushed and drained. The can contents are drawn into a storage tank by suction for recycling or disposal. The compactor is manually operated from an electrical control panel disposed upon the frame. A protective door shields the operator from waste products liberated from crushed cans.

The crusher assembly comprises a hydraulic cylinder driving an extensible ram which terminates in a platen adapted to contact and mate with the can bottom. In response to ram movement the platen directs cans into the receiver assembly which mates with the can top. The receiver assembly comprises a rigid tubular stationary sleeve that coaxially receives a displaceable cylinder into which cans are forced. A rigid generally tubular union disposed at the bottom of the sleeve limits travel of the cylinder, and establishes a fluid flow path into a remote collection reservoir for fluids liberated from the cans.

A rigid valve guide is disposed within the union. Fluid flow communication between the interior of the cylinder and the union is preserved. A rigid, can-piercing lance projecting from the valve guide punctures cans after the cylinder is displaced a predetermined distance. A fluid control valve is mounted within the valve guide for selectively blocking fluid flow through the union. The valve stem receives a tubular receptacle that coaxially mates with the spray can actuator nozzle.

Since downward movement of the sleeve is limited, once sleeve travel stops, further ram movement will forcibly compress the can. As the ram moves lower into the compaction position, the empty can will be crushed against the displaced cylinder. A rigid shoulder defined within the cylinder prevents the can from escaping in cooperation with the ram platen that mates with the can bottom.

When the last compaction stage is complete, the operator raises the ram out of contact with the can, opens the safety door and manually removes the crushed can, which may be transferred to a separate solid waste bin.

Thus it is a broad object of the present invention to facilitate the environmentally safe disposal of aerosol cans.

Another broad object of the present invention is to provide safe and convenient means for evacuating and compacting aerosol cans.

Yet another broad object of the present invention is to provide a convenient aerosol can disposal unit that enables full compliance with EPA-established standards for hazardous waste disposal.

A further object of the present invention is to provide a power device capable of automatically depressurizing, evacuating, and compacting aerosol cans.

An additional object of the present invention is to provide an aerosol can compactor that can be safely operated on site at a recycling center.

Yet another object of the present invention is to provide an aerosol can evacuator that safely separates the liquid content of the can from the fluid propellant.

A further object of the present invention is to provide apparatus for assuring that aerosol cans are fully emptied of potentially hazardous contents prior to landfill disposal.

Still another object of the present invention is to provide can crusher apparatus that safely collects the fluid contents of aerosol cans for subsequent incineration.

Another broad object of the present invention is to provide an aerosol can crusher of the nature described that safely vents fluid propellants from the cans.

A further object of the present invention is to provide an aerosol can compaction unit that safely depressurizes and evacuates cans prior to compaction.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 2 is rear elevational view thereof;

FIG. 3 is a fragmentary longitudinal sectional view taken generally along line 3—3 of FIG. 2;

FIG. 4A is an enlarged fragmentary isometric view of the can nozzle and the receiver receptacle;

FIG. 5 is a vertical cross sectional view taken generally along line 5—5 of FIG. 2;

FIG. 8 is longitudinal sectional view taken similar to FIG. 6 but showing a can fully crushed; and, FIG. 9 is an enlarged, fragmentary isometric view illustrating the preferred venturi system, with portions thereof shown in section for clarity.

DETAILED DESCRIPTION OF THE DRAWINGS

Figure 1:
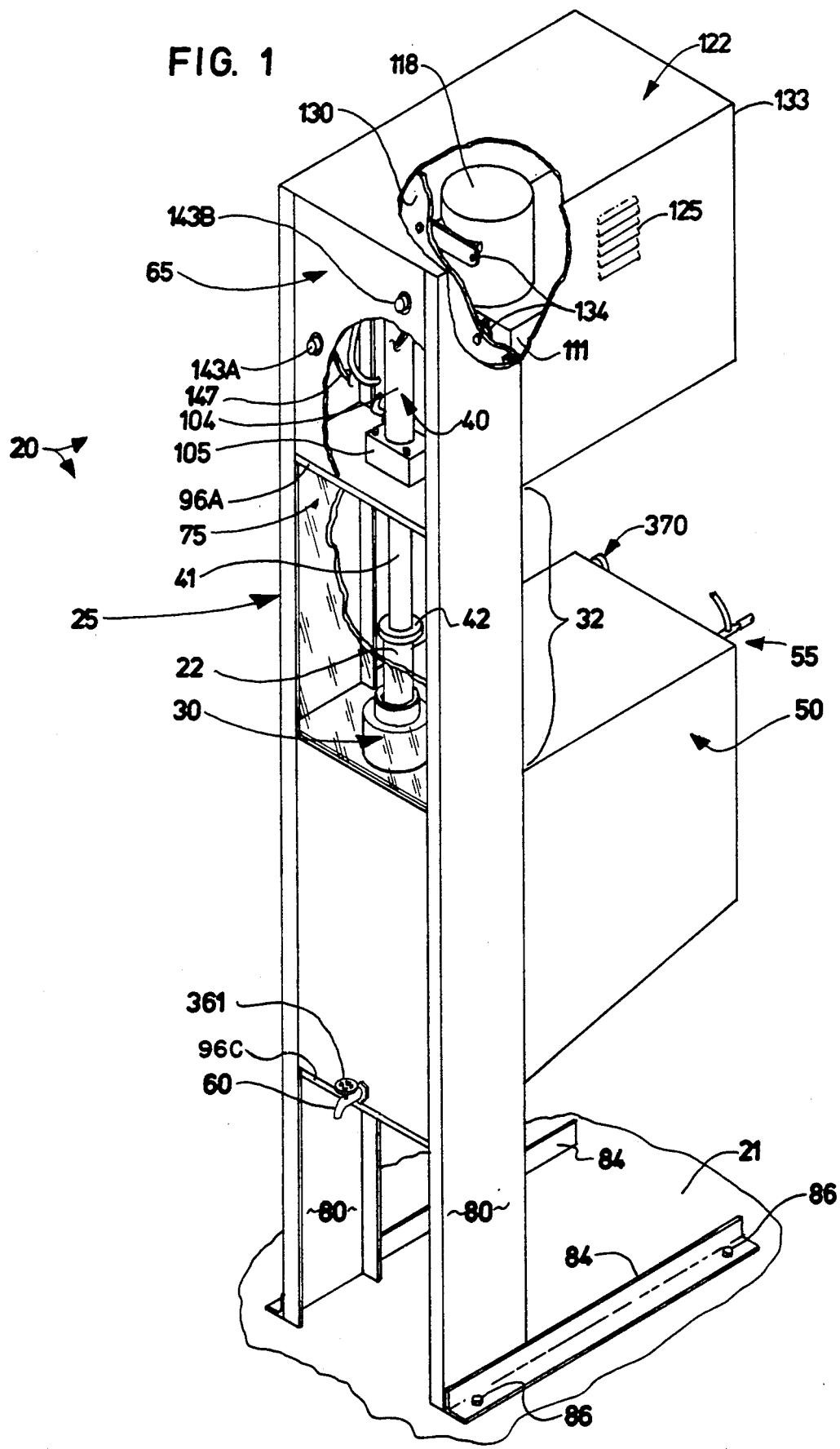
FIG. 1 is a fragmentary perspective view of my new Disposal Compactor for Aerosol Cans, in which portions thereof have been broken away for clarity.

With reference to the accompanying FIGS. 1-3, my new disposal compactor for aerosol cans is broadly designated by the reference numeral 20. The rigid, generally upright frame 25 is adapted to be secured to a supporting surface 21 such as a concrete floor or the like. A telescoping can receiver assembly 30 is positioned in an accessible compaction area 32 defined centrally in frame 25. A preferably hydraulic crusher assembly 35 is disposed above area 32 for compressing cans 22 to be processed against receiver 30. Crusher assembly 32 preferably comprises a hydraulic ram assembly 40 which forcibly deploys slidable ram 41, compressing the can 22 against the receiver assembly 30. During compression the can will be punctured and drained as explained below. After puncturing the can contents are drawn into a storage tank 50, secured to the frame and disposed in fluid flow communication with the receiver assembly 30. Each can 22 is safely drained, evacuated, and forcibly compacted for subsequent recycling or disposal. Compactor 20 is manually controlled from a control panel broadly designated by the reference numeral 65 located out of reach of the compaction area 32 (FIG. 2). A protective, preferably transparent door 75 shields the operator from contact with the can or any of its contents which might accidentally be released during use.

Frame 25 preferably comprises a pair of rigid, spaced apart upright sides 80 formed of channel steel. Frame sides 80 are each secured to angle steel legs 84 disposed upon surface 21. Preferably legs 84 are permanently secured by anchor bolts 86 or the like to floor 21 with rigid lag bolts 86. Rigid cross braces 96A, 96B are welded between the frame sides 80 in spaced-apart, generally parallel relationship. Braces 96 structurally support tank 50, receiver assembly 30, and crusher assembly 35.

With primary reference directed to FIGS. 1-3, crusher assembly 35 comprises a hydraulic cylinder assembly 40 comprising an elongated cylinder casing 104 secured to cross piece 96A by block 105 and appropriately dampened to prevent undesired vibration. Casing 104 coaxially, slidably receives and houses an extensible ram 40 terminating in a platen 42 which forcibly contacts the can 22. Platen 42 includes a recessed region 43 circumscribed by channel 45 which mates with the bottom flange 23 of the can to be processed. Ram 40 projects through cross brace 96A downwardly toward the can receptive area 42 and terminates in the platen, which is slidably displaceable between a raised position, intermediate compression positions shown in FIGS. 1 and 2, and a compaction position shown in FIG. 3. When first contact is made, the platen captivates the can end, and the can cannot escape destruction. As ram movement continues the platen forces the can against the receiver assembly, which, as will hereinafter be explained, is similarly configured to mate with and match the profile of the can.

The hydraulic cylinder assembly is preferably powered by a fluid system such as hydraulic pump 111 driven by conventional motor 118. In the best mode, the pump 111 is direct drive. The motor 118 is rated at 120 v.a.c. and one-half horsepower. Pump 111 and motor 118 are protectively enclosed within a rigid, generally cubicle shroud 122. Shroud 122 is preferably constructed of industrial grade sheet steel or the like, and may be lined with insulating material 123. Shroud 122 comprises a pair of sides having ventilation louvers 125, a rear wall 130, and an access door 133. Door 133 facilitates access to the hydraulics for routine maintenance and repairs.

Pump 111 is preferably mounted to rear wall 130 by a vibration-dampening bracket 134. Electrical control box 138 (FIG. 3) electrically couples crusher assembly 35 to pushbutton controls 143 which protrude forward through control panel 65. Preferably cables 147 which link control panel 138 to buttons 143 are shielded and harnessed safely away out of the reach of any moving parts. Fluid lines 154 penetrate rear wall 130 to couple casing 104 to pump 111.

Preferably activation of the ram for each stage of the compaction cycle requires simultaneous activation of two spaced-apart buttons 143A, 143C, so that both of the operator's hands are safely separated from compaction area 32. In addition, it is preferred to provide door 75 with a safety switch to prevent activation of the ram when the door is not securely closed over the compaction area, which houses receiver assembly 30.

With additional reference now directed to FIGS. 4, 4A, 4B and 5, telescoping receiver assembly 30 comprises a rigid, tubular sleeve 160. Sleeve 160 coaxially receives a slidable, spring-biased cylinder 165 and a rigid, tubular union 170. Sleeve 160 is preferably machined of stainless steel and comprises a rigid tubular body 172, an internally threaded base 174 with threads 175, a top 178, and an open interior 179. Sleeve 160 comprises an integral rigid, inwardly projecting rim 195 which can have an optional circumferential groove 197 for an optional O-ring 201. In assembly base 174 is threadably secured to a rigid, annular damper ring 183 which includes external threads 184 and which is securely bolted to frame cross brace 96B by machine screws 186 which penetrate orifices 187A, 187B.

Sleeve 160 defines a path for vertical displacement of slidable cylinder 165. Cylinder 165 comprises a hollow tubular interior 168 coaxially defined by circumferential tubular body 213. Cylinder 165 comprises a circular, inwardly projecting lip 161 at its top, which includes an integral reduced-diameter, can-receptive mouth 215 bounded by a peripheral flange -receptive shoulder 218. The lower, circular outwardly defined lip 217 formed at the base of cylinder 165 is captivated within sleeve 160, being restrained by contact with rim 195. A circumferential groove 219 is defined about the external periphery of lip 217 to receive a plastic positioning ring 221. Ring 221 is coaxially, frictionally slidable within sleeve 160, and its purpose is to both seal and prevent metal-to-metal contact between sleeve 160 and cylinder 165.

Cylinder 165 is disposed for vertical displacements within sleeve 160. Downward travel of cylinder 165 is limited by eventual contact with union 170 described hereinafter. When this contact is made the can will be crushed completely. Shoulder 218 defined at the top of cylinder 165 receives and contacts the output neck 24 of a can 22 to be crushed. The inner annular surface 231 of cylinder lip 161 is contacted by cylinder return spring 234. Spring 234 biases cylinder 165 upwardly, and is partially compressed in response to downward deflection of cylinder 165 during crushing operations. Spring 234 is captured between cylinder surface 231 and the top of rigid union 170.

Rigid, tubular union 170 is secured coaxially within sleeve 160 at the bottom of the receiver assembly. The union's tubular head 245 is integral with a rigid, reduced diameter exhaust pipe 250, which is coaxially press fitted within annular ring 183. Head 245 is coaxially captured within sleeve 160. Its integral exhaust pipe 250 passes coaxially through ring 183 and vents gases liberated from crushed cans. A peripheral ledge 253 centered at the top of head 245 seats return spring 234. The lower shoulder 257 of head 245 rests upon ring 183. As best viewed in FIG. 3, exhaust pipe 250 projects downwardly into tank 50. A reduced-diameter throat 263 defined by internal flange 267 establishes fluid flow communication between cylinder bore 168 via union bore 251 and tank 50. Throat 263 is selectively blocked and unblocked by a spring-biased, fluid control valve 270, which is operatively mounted to the valve guide 280 disposed within union 170.

Figure 4B:
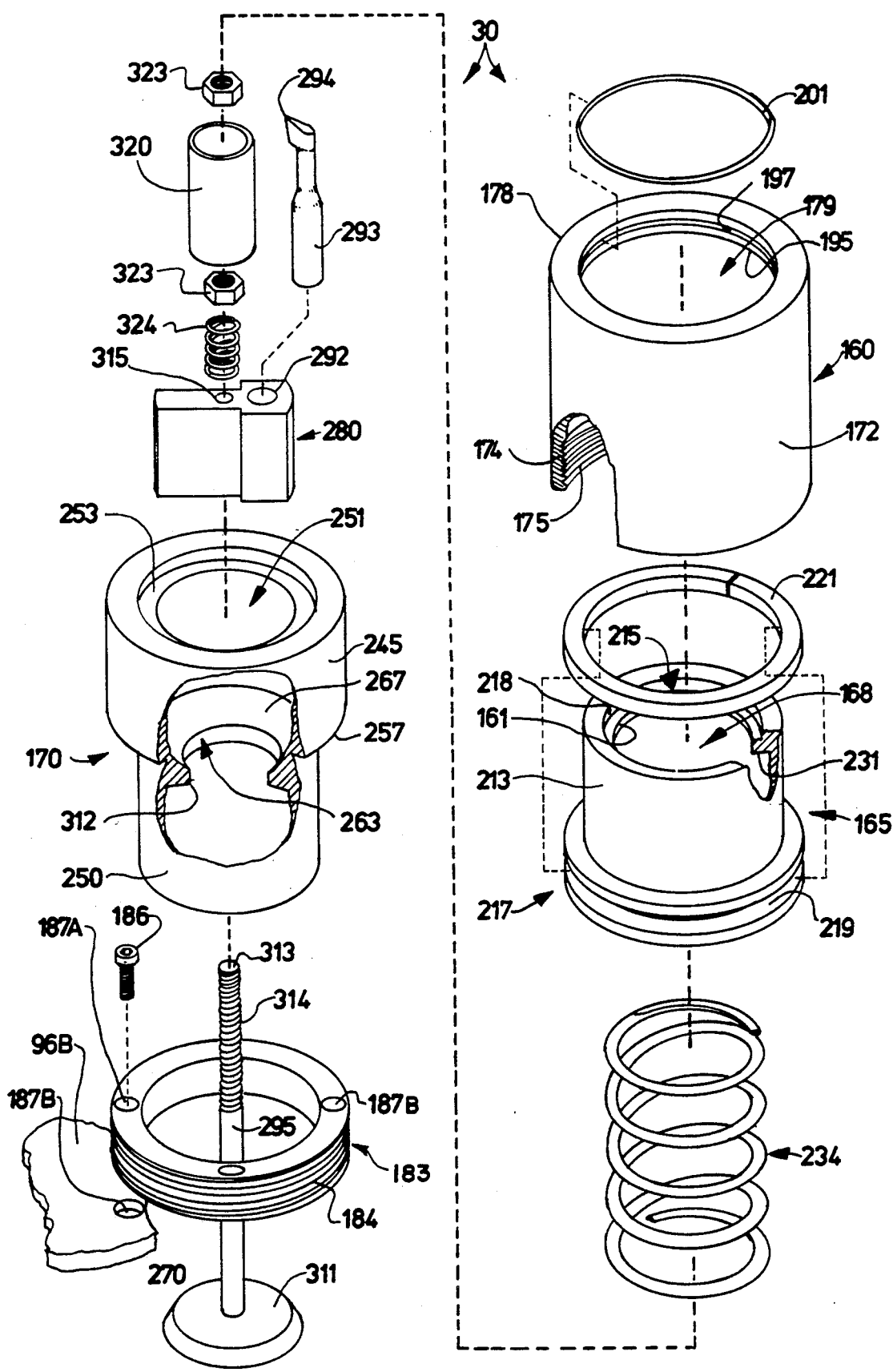
FIG. 4B is an enlarged, exploded isometric assembly view of the preferred receiver assembly, with portions thereof broken away or shown in section for clarity, or omitted for brevity.

Valve guide 280 is generally in the form of a parallelepiped. The thickness of the guide is less than the diameter of bore 251, so that fluid flow communication between the interior of the cylinder 165 and the exhaust pipe 250 is established. Fluid can flow downwardly between its sides and the bore 251 of union 170 into which it is preferably press fitted (FIGS. 4B, 5). A rigid, elongated can-piercing lance 293 having a sharpened tip 294 is secured within orifice 292 in the top of valve guide 280 and projects upwardly into cylinder interior 168 to puncture cans. Puncturing occurs after cylinder 165 is displaced a predetermined distance, dropping interiorly of the sleeve 160 carrying the can with it toward lance 293.

Valve 270 is disposed for reciprocal movement within guide 280. It comprises an elongated valve stem 295 which terminates at its lower end in head 311. Valve head 311 is seated against valve seat 312 defined beneath internal flange 267 of union 170 to unblock throat 263 when depressed downwardly. The opposite end 314 of stem 295 penetrates passageway 315 in guide 280 and threadably mounts a rigid, tubular receptacle 320. Stem end 313 will be spaced from the normally plastic spray actuator nozzle 24B of the aerosol can, which will be received within receptacle 320. As the can is pressed downwardly, its output nozzle will thus be captivated within the receptacle. Preferably the receptacle is threadably adjusted in position so that the can nozzle will not be activated or depressed during crushing, so that fluids will not collect within receptacle 320. Destructive puncture by lance 293 vents the cans. Receptacle 320 may be positioned at any selective depth along the threaded plunger to accommodate cans having spray valves 24B of different dimensions, and it can be locked into a desired position by lock nuts 323. A valve return spring 324 captivated upon stem 295 biases valve 270 to a raised position shown in FIG. 4 in which head 311 blocks fluid flow communication between receiver assembly 30 and tank 50.

With reference redirected to FIG. 3, tank 50 is disposed in fluid flow communication with the receiver assembly 30, so that after puncturing the contents of the can will be drawn therewithin. Captured fluids are preferably transferred from tank 50 via drain valve 60 to suitable barrels for subsequent incineration. A vent assembly broadly designated by the reference numeral 55 establishes suction within tank 50.

Tank 50 comprises a generally planar top 350 and an angular bottom 354. tank 50 is securely supported on frame 25 between cross braces 96B and 96C. Top 350 supports the telescopic can receiver 30 assembly and is penetrated by exhaust pipe 250. Bottom 354 slopes downwardly between the rear wall 354 and its front wall 356. This slope facilitates subsequent drainage of the captured liquids 359 via a drain valve 60 associated with front wall 356. Valve 60 is preferably manually controlled by a conventional spigot 361. Pressure created by gasses 363 captured during the depressurization stage are regulated by vent system 55 associated with rear wall 354.

Figure 6:
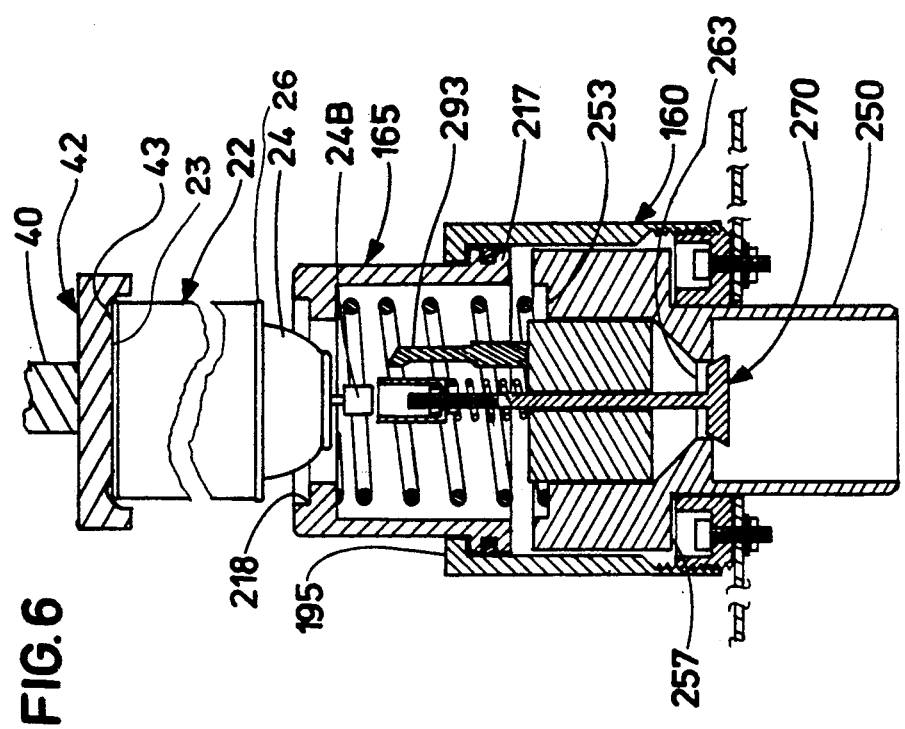
FIG. 6 is longitudinal sectional view taken generally along line 6—6 of FIG. 5, showing a can immediately prior to crushing.
Figure 7:
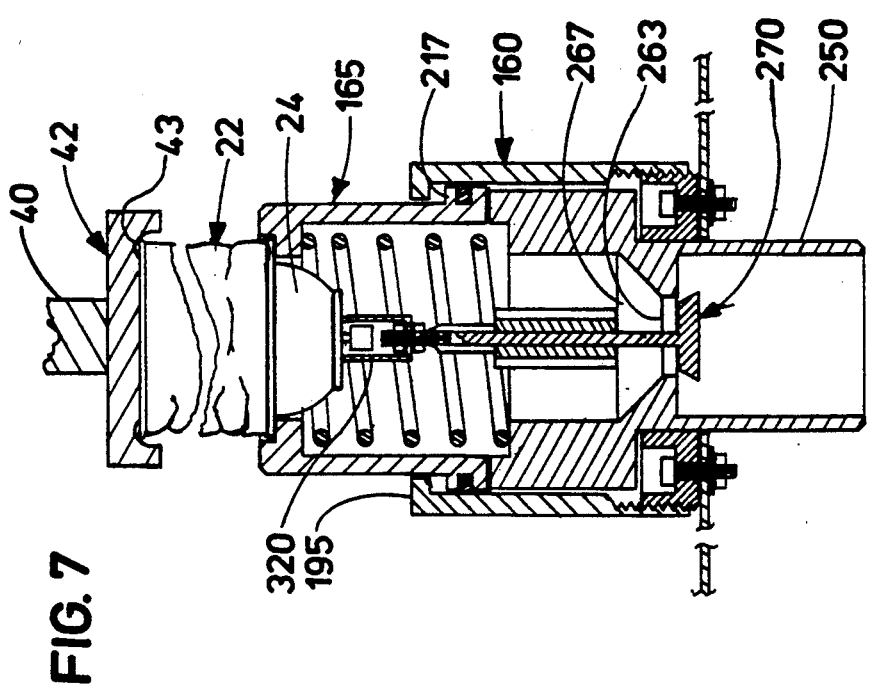
FIG. 7 is longitudinal sectional view taken generally along line 7—7 of FIG. 5 showing a can in the process of being crushed.

With reference to FIGS. 1, 3 and 9, vent system 55 comprises a tubular breather 370 which may be selectively capped to inlet ambient air. Vent tube 381 may be activated by connection to available HP air via hose 382, which outputs to hose 386, creating suction applied to the tank via hose 380. Thus a fluid flow results within reservoir 50, as generally indicated by arrow 363 in FIG. 3. Since tank pressure is below atmospheric pressure, all discharged can contents will be drawn therewithin, as long as valve 270 is "open" (FIGS. 6-8). Once the container is full of collected waste fluids, it may be conveniently drained for safe disposal or incineration.

Operation

Compactor 20 automatically depressurizes, evacuates, and crushes an aerosol can in a single compaction cycle. Based on my experimentation a single cycle, which begins when the can is fitted into receiver assembly 30 and ends when the crushed can is released, requires roughly twenty seconds. Under optimum conditions with a relatively skilled operator, my compactor processes 180 cans per hour.

As best viewed in FIG. 4B, can 22 is installed in an inverted position upon the open mouth 215 of cylinder 165. The can is coaxially aligned with cylinder 165. Its rigid top flange 26 is received within shoulder 218 and its output neck 24 projects downwardly into bore 168. The spray nozzle 24B projects coaxially toward tubular receptacle 320.

When the can is properly aligned and positioned, the operator closes safety door 75 and depresses buttons 143 to activate ram 40. The platen 42 moves down into engagement with the bottom of the can, and the compaction cycle begins.

Additional reference is now directed to FIGS. 6-8 of the accompanying drawings. During the first instant of platen travel (FIG. 6) the cylinder will start downwardly, moving against yieldable tension from its retainer spring 234. The spray nozzle 24B of can 22 is received within receptacle 320, but it will be spaced apart from the valve spring stem end 313, so that nozzle 24B will not be activated. The conical top 24 of the can will be pierced by the lance 293, which extends upwardly from valve guide 280. Travel of the cylinder 165 ends when lip 217 impacts union 170. The fluid contents of the can are dispersed into the tank 50. As the platen drives downwardly, the depressurized and evacuated can is crushed. When pressure from the ram is released, spring 234 urges cylinder 165 upwardly out of sleeve 160, pushing the compacted can into the compaction area, above tank 50. Pressure against valve guide 280 is released, and the valve moves upwardly into contact with seat 312, closing the tank and preventing escape of the captured fluids. The operator then raises the ram up out of contact with the can, which automatically unlatches the safety door so that the operator may safely reach into the compaction area to retrieve the crushed can for disposal.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A disposal compactor for crushing used aerosol spray cans and the like of the type having a nozzle and an output neck and environmentally safely recovering their residual contents, said compactor comprising:

vertically upright frame means adapted to be disposed upon a supporting surface for mounting said compactor;

rigid, telescoping receiver means operationally mounted within said frame means for receiving an inverted can to be processed;

fluid holding tank means in fluid flow communication with said receiver means for receiving waste fluids ultimately liberated from said can;

crusher means secured to said frame means for activating said receiver means by first contacting said can and forcibly moving it downwardly against said receiver means and thereafter compressing said receiver means during operation of said compactor, said crusher means comprising:

a hydraulic cylinder operatively disposed in said frame means above said receiver means, said hydraulic cylinder axially aligned with said receiver means;

ram means driven by and projecting downwardly from said hydraulic cylinder toward said receiver means; and, platen means secured to said ram means for engaging a bottom flange of said can to drive it downwardly said platen means comprising a recess for mating with said can; and, wherein said receiver means comprises:

tubular, stationary sleeve means for securing said receiver means to said frame means, said sleeve means comprising a top and a bottom;

tubular cylinder means coaxially, slidably disposed within said sleeve means and reciprocally movable a limited distance therewithin for first receiving a can to be processed, said tubular cylinder means comprising a shoulder portion adapted to mate with an upper flange of said can;

tubular union means coaxialy, fixedly disposed within said sleeve means at said bottom for limiting travel of said tubular cylinder means, said union means comprising a head and an exhaust pipe integral with said head and extending downwardly through said receiver means, said union head and exhaust pipe defining a bore providing fluid flow communication between said receiver means and said tank means;

valve means normally occluding said exhaust pipe but displaceable by can contact for opening said exhaust pipe to vent fluids to said fluid holding tank means;

valve guide means disposed within said union means for mounting said valve means, said valve guide means having a thickness less than said bore for preserving fluid flow communication, said valve guide means comprising upwardly projecting lance means adjacent said valve for puncturing the neck of said can after predetermined movement of said tubular cylinder means downwardly within said sleeve means, and valve return spring means for normally biasing said valve means closed;

an adjustable, tubular receptacle secured to said valve adjacent said lance for receiving the nozzle of an aerosol can to be processed and for preventing said nozzle from being actuated during can movement; and, cylinder return spring means for normally biasing said tubular cylinder means upwardly within said sleeve means.

* * * * *